April 28, 1959 A. H. SEPAHBAN 2,884,620

MAGNETIC SWITCHING MEANS

Filed Sept. 24, 1953 4 Sheets-Sheet 1

INVENTOR
AMIR H. SEPAHBAN
BY William D. Glover
AGENT

April 28, 1959 A. H. SEPAHBAN 2,884,620

MAGNETIC SWITCHING MEANS

Filed Sept. 24, 1953 4 Sheets-Sheet 2

INVENTOR
AMIR H. SEPAHBAN
BY William J. Glover
AGENT

MAGNETIC SWITCHING MEANS
Filed Sept. 24, 1953 4 Sheets-Sheet 3
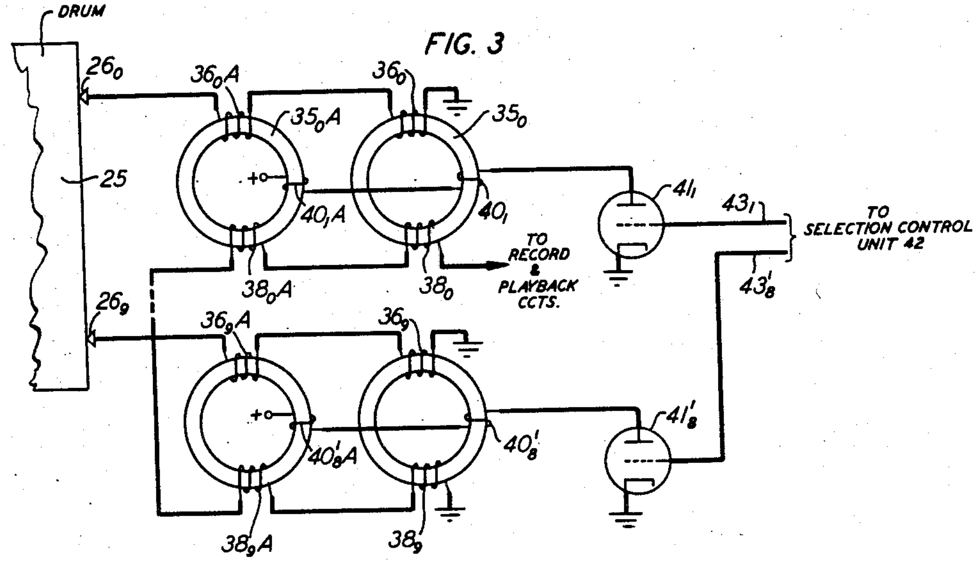
FIG. 3
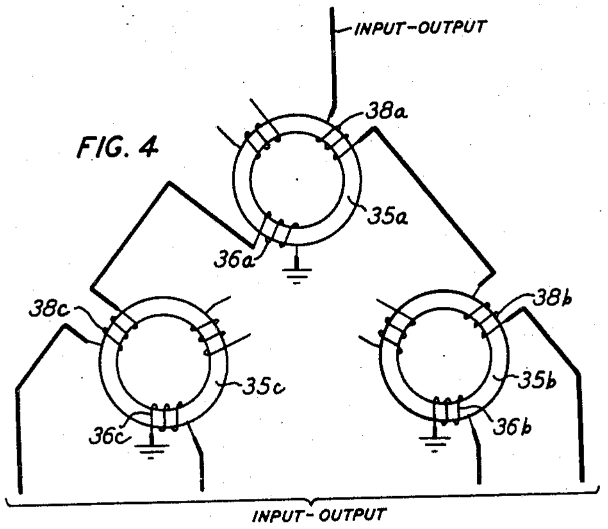
FIG. 4
| CONTROL WINDING | CORE $35_0$ | $35_1$ | $35_2$ | $35_3$ | $35_4$ | $35_5$ | $35_6$ | $35_7$ | $35_8$ | $35_9$ |
|---|---|---|---|---|---|---|---|---|---|---|
| $40_1$ | X | | X | | X | | X | | X | |
| $40_1'$ | | X | | X | | X | | X | | X |
| $40_2$ | X | X | | | X | X | | | | |
| $40_2'$ | | | X | X | | | X | X | | |
| $40_4$ | X | X | X | X | | | | | | |
| $40_4'$ | | | | | X | X | X | X | | |
| $40_8$ | X | X | | | | | | | | |
| $40_8'$ | | | | | | | | | X | X |
FIG. 5
INVENTOR
AMIR H. SEPAHBAN
BY William [signature]
AGENT INVENTOR
AMIR H. SEPAHBAN
BY William L. Glover
AGENT

United States Patent Office 2,884,620

Patented Apr. 28, 1959

2,884,620

MAGNETIC SWITCHING MEANS

Amir Hassan Sepahban, New York, N.Y., assignor to Monroe Calculating Machine Company, Orange, N.J., a corporation of Delaware

Application September 24, 1953, Serial No. 382,167

14 Claims. (Cl. 340—174)

This invention relates to switching, and, more particularly, to an improved selection circuit embodying saturable magnetic cores.

In general, the purpose of a selection circuit is to provide, under the influence of external control means, a temporary connection between one device and a selected one of a plurality of other devices whereby one of the pair of temporarily inter-connected devices is permitted to exercise control over the other.

Prior switching circuits embodying a plurality of saturable magnetic cores have been able, under influence of an external control, to effect a change in the magnetic state of a selected core and thereby to excite a device connected to a winding on said core in which a voltage is induced as a result of said change. In the known circuits the input signals produce rather large magnetizing currents capable of driving a core from one remanent point to saturation in the direction of opposite polarity, whence it returns to an appropriate remanent point of the said opposite polarity. A voltage is induced in a winding on said core as a result of the change in the magnetic state of the core. A signal of opposite polarity to that of the input signal must be applied to return the said core to its original remanent point to prepare the core for subsequent operation.

The instant invention does not operate to shift the magnetic state of a core from its positive to its negative remanent point or vice versa. Cores having non-rectangular hysteresis curves are used and the magnitude of input signals thereto is such as only to change the magnetic state of a core in the vicinity of that one of the remanent points which is chosen as the operating point for the core. This operation of the invention makes it possible for input signals of approximately equal magnitude but of opposite polarity to be used to produce output signals by inductive coupling which are also of substantially the same magnitude but of opposite polarity. Further, since the input and output signals are of approximately the same magnitude and polarity the functions of the input and output windings on a core may be reversed.

An object of the present invention, therefore, is the provision of a switching circuit embodying saturable magnetic cores which is capable of switching oppositely polarized signals between a selected one of a plurality of devices and some other device.

Another object of the present invention is the provision of a selection circuit embodying saturable magnetic cores which is capable of effecting a connection between a selected one of a plurality of devices and some other device whereby the one controls the other and/or vice versa.

According to an illustrative embodiment of the invention a saturable magnetic core is provided for each of the devices between which a selection is to be made. Each core is provided with a first winding connected to the associated device and with a second winding which is connected, in series with those of the other cores, to the device with which the first said devices are to be connected selectively. Each core is also provided with control windings connected to selection control means which operate to drive all of the cores save a selected one into saturation in a given direction of polarity. Ideally, only the unsaturated core is affected magnetically by currents flowing through the first or second windings thereof, and only the first and second windings associated with that core are capable of affecting each other inductively.

Another object of the invention is so to construct and arrange the selection circuit of the invention that the same is capable of handling signals of opposite polarity and of widely divergent magnitudes and frequencies without distorting the same or unduly attenuating them.

According to the invention, the cores used in the selection circuit are constructed of a magnetic material having a non-rectangular hysteresis loop whose slope at the remanent points thereof is as high as possible and with which the ratio of the slopes at the remanent points and at the associated saturation points is as high as possible.

In a modified form of the invention the cores are arranged in pyramid or tree fashion and in addition to utilizing the non-saturated condition of the cores to provide inductive coupling between the first and second windings thereon, the saturated condition of the cores is utilized to provide series paths through interconnected windings on two or more thereof, in accordance with the principle of operation of magnetic amplifiers, i.e. a large drop occurs across a winding of an unsaturated core but not across a winding of a saturated core.

Other objects and features of the invention will become apparent from the following description when read in the light of the drawings of which:

Figs. 1 and 2 taken together and applied end to end constitute a schematic wiring diagram of an illustrative embodiment of the invention;

Fig. 3 is a more or less fragmentary wiring diagram of a modified form of the invention;

Fig. 4 is a somewhat diagrammatic illustration of another modification of the invention;

Fig. 5 is a diagram which indicates the disposition of control windings on the magnetic cores of the circuit of Figs. 1 and 2;

The selection circuit of the invention, although capable of use in a wide variety of settings, is particularly well adapted for use in connection with a multi-channel magnetic drum and is illustrated and will be described in connection with such a drum.

Figure 1:
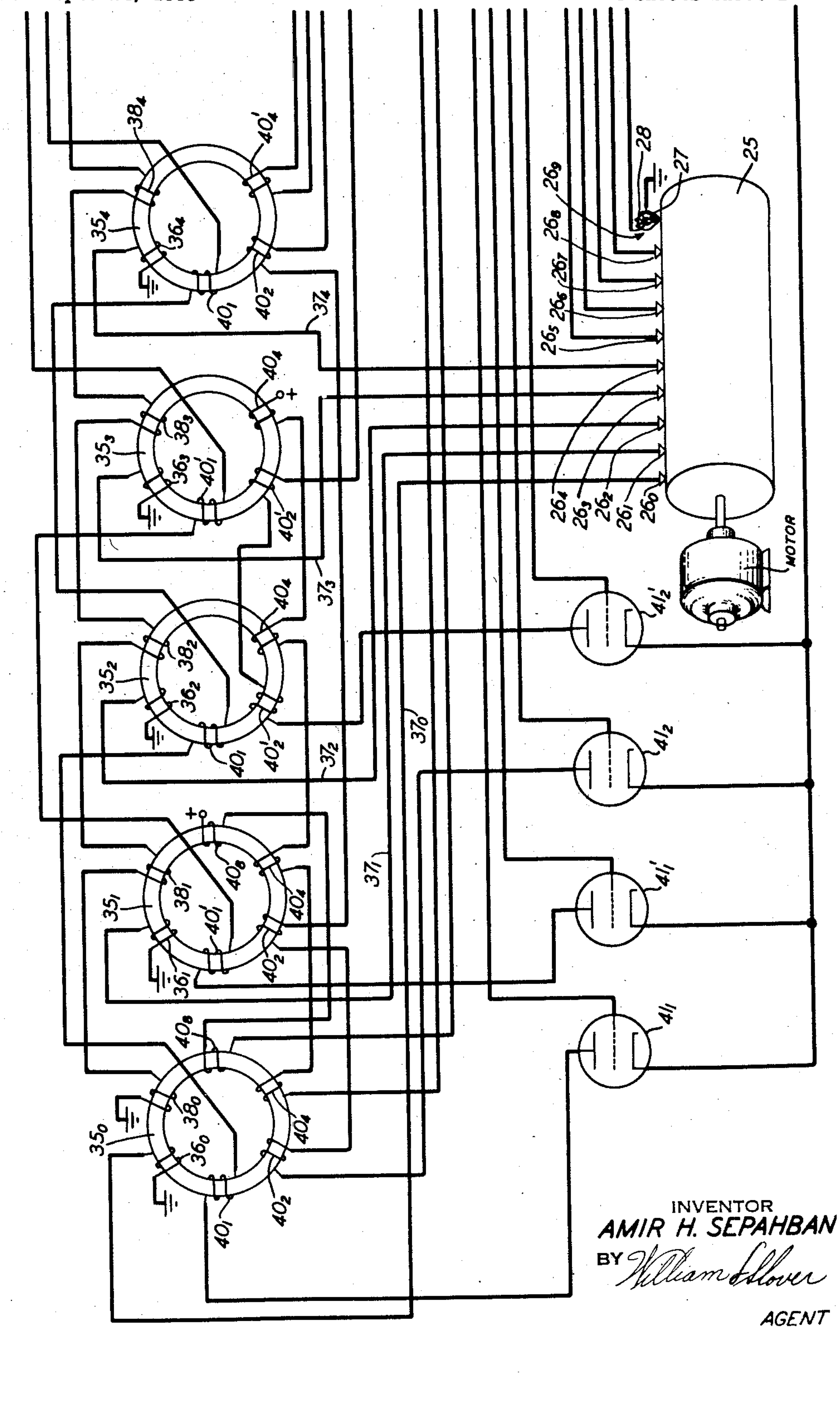

Referring to Fig. 1, there is disclosed a magnetic drum 25 which comprises a rotating cylindrical member having a homogeneous magnetizable coating on its circumferential surface. The magnetizable periphery of the drum is divided, theoretically, into a plurality of contiguous circumferential channels or tracks each provided with a combined reading and recording head 26. Assuming the rate of rotation of the drum to be constant, each rotation thereof consumes a definite number of equal time periods during each of which a different spot, cell or area of each channel is positioned adjacent the associated head 26 to be magnetized by the latter or, if the head is being used to read or playback previously recorded data, to induce a signal in the coil thereof.

Preferably, the spots or areas are magnetized with one polarity to represent binary one and with the opposite polarity to represent binary zero. To this end each of the reading-recording heads 26 comprises a core or pole piece 27 having a narrow air gap therein which is located in close proximity to the surface of the drum, and a coil 28 wound on said core. One end of each coil 28 is connected to ground, and signals of opposite polarity with respect to ground are applied to the other end of the coil to effect current flow in opposite directions therein, and, to effect magnetizing of spots of opposite polarity.

The several reading-recording heads 26 are connectable individually, by the selection means of the invention either with a record circuit 30 (Fig. 2) or a reading or playback circuit 31 depending upon which operation is desired, namely, recording or reading. Selection between the record circuit 30 and the playback circuit 31 may be accomplished by any suitable means, for example, by a transfer contact 32 for a relay whose coil 33 is connected in anode circuit of a triode 34 which is normally cut off but which is made conductive to effect energization of the relay whenever it is desired to use the record circuit 30. The details of the record circuit 30 and the playback circuit 31 form no part of the present invention and need not be described herein. For present purposes it is sufficient to understand that record circuit 30 delivers to whichever reading-recording head 26 it is connected with, sharp recording pulses of rather large magnitude (say, 600 volts, 150 milliamps.), but of short duration (say, 2 or 3 microseconds), said pulses being of opposite polarity with respect to ground for binary one and binary zero. Playback circuit 31 on the other hand is a rather sensitive amplifier and detector adapted to amplify the minute signals (say, 15–60 millivolts), induced in the coil 28 of the reading-recording head with which it is connected and to detect the identity of said signals as binary one or binary zero.

It will readily be seen, therefore, that the selection means which are utilized to connect the reading-recording heads 26 with the record and playback circuits individually must be capable of handling both low level (15–60 millivolt) playback signals and high level (600 volt) recording pulses.

In the illustrated (Figs. 1 and 2) embodiment of the invention the record and playback circuits 30 and 31 cooperate with ten reading-recording heads 26, but it is to be understood that this number may be increased or decreased as desired. Each head 26 has a saturable magnetic core 35 associated therewith, and, for convenience in relating each of the former with the correct one of the latter, the reference characters for the cores and the heads are provided with the appropriate subscripts 0, 1, . . . 9. Each core 35 is provided with a winding 36 having one end grounded and the other end connected via a conductor 37 with the coil 28 of the associated head 26. The cores 35 are also provided with windings 38, one per core, connected in a series path between ground and the transfer contact 32 which connects said path with the record circuit 30 or the playback circuit 31.

The means thus far described constitute ten transformers 35, 36, 38, each inductively coupling a reading-recording head 26 with the transfer contact 32 and thereby, with recording circuit 30 or playback circuit 31. Each transformer is capable of delivering to the playback circuit 31 the reading signals induced in the associated head 26, and of delivering to said head the record impulses produced by record circuit 30. However, it is desired that at any given time only a selected one of the heads 26 be inductively coupled to the transfer contact 32 for control by the record circuit 30 or to control the playback circuit 31. To this end, means are provided to drive all of the cores 35 save that associated with the selected head into magnetic saturation and thereby to prevent inductive coupling between the windings 36 and 38 on said cores. This, of course, effectively disables all of the transformers save that associated with the selected head and only the latter provides an inductive coupling between its head 26 and the series path extending through the windings 38 to the transfer contact 32. In accordance with the known principle of operation of magnetic amplifiers, the windings 38 on the saturated cores offer very little resistance to signals transmitted to or from the winding on the unsaturated core and thus have only a very small attenuating effect on such signals. Therefore the said series path may be considered as a conductor extending between the transfer contact 32 and the winding 38 on the unsaturated core 38 across which, substantially all of the drop in said path occurs.

Figure 2:
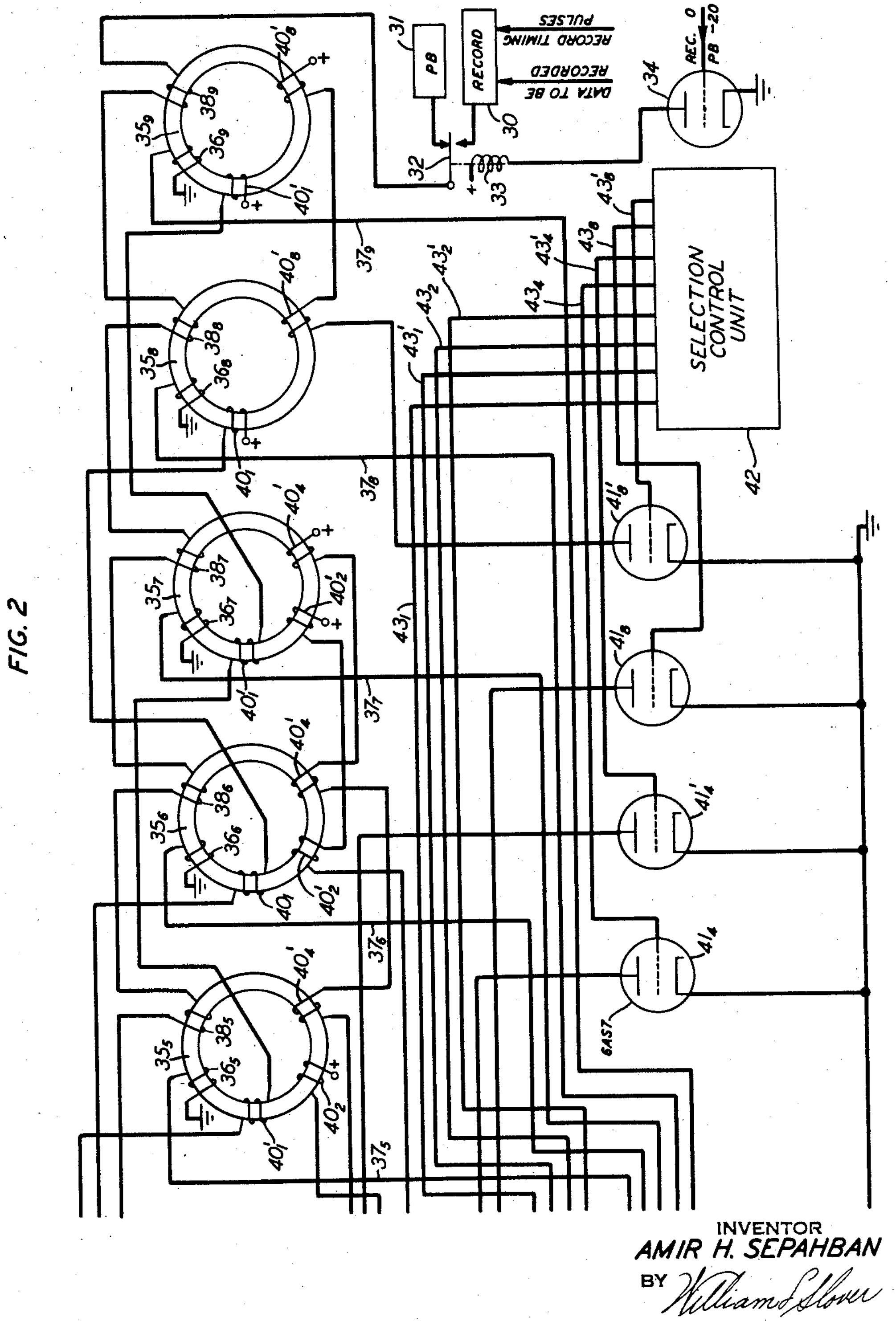

The means for driving all of the cores 35 save one into magnetic saturation comprises one or more control windings 40 on each core 35, a series of vacuum tubes 41 for effecting current flow in said windings, and a Selection Control Unit 42 which controls conduction of the tubes 41. As shown in Figs. 1 and 2, the tubes 41 are triodes and the anode of each is connected through a winding 40 on each of one or more of the cores 35, to a source of anode potential. The cathodes of the triodes are grounded and the grids thereof are connected to output lines 43 of control unit 42.

Figures 6, 7, 8:
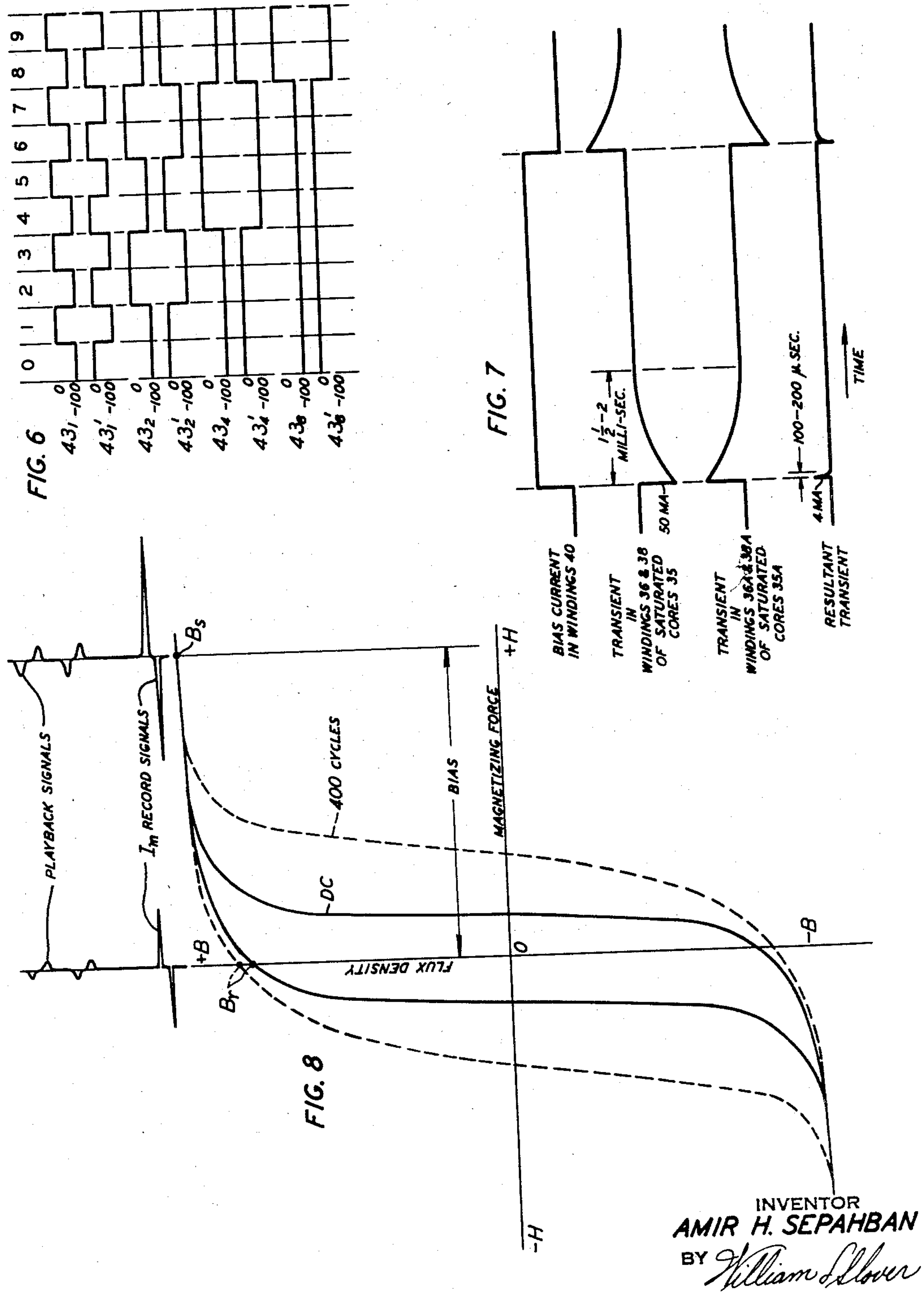
Fig. 6 is a pulse chart which illustrates the manner in which the selection circuit of Figs. 1 and 2 is controlled.
Fig. 7 is a wave diagram illustrating the manner in which the modified form of the invention shown in Fig. 3 is utilized.
Fig. 8 is a diagrammatic illustration of a family of hysteresis curves for the core material utilized by the means of the invention at various frequencies.

In the illustrated embodiment of the invention the potential states of the output lines 43 of control unit 42 represent the digits 0, 1, 2, . . . 9 in the binary coded decimal system of notation, said digits, in turn, representing the reading-recording heads $26_0$, $26_1$, $26_2$, . . . $26_9$ respectively. Two lines 43 are provided for each of the four binary positions (1, 2, 4 and 8) of a binary coded decimal digit, one line to assume a high potential of zero volts when a binary one occurs in that position and a second line to assume said high potential when a binary zero occurs in that position. When either line of a pair assumes the high, or zero volt, potential, the other line assumes a low potential of say −100 volts. The potential states of the lines 43 for each digit 0, 1, 2, . . . 9 are indicated in the chart of Fig. 6 wherein it will be seen that the digit 7, for example, which calls for binary ones in the one, two and four positions and a binary zero in the eight position, is represented by high potentials on lines $42_1$, $43_2$, $43_4$, and $43_8'$, and low potentials on the remaining four lines.

The internal construction of the Selection Control Unit and the manner and means whereby the same is influenced to apply high and low potentials to the output lines 43 form no part of the present invention and thus will not be described herein. However, it is worthwhile mentioning that if desired the Selection Control Unit disclosed in the copending application Ser. No. 255,712 to Joseph McCarroll et al. may be utilized either as described therein or in a modified form in which the output lines thereof assume the potential states appropriate to each setup of the circuit simultaneously. This modification may consist in applying the two outputs of each of the flip-flops 64 of the disclosed circuit to means operable only at predetermined times to set and reset another flip-flop from which output lines for the circuit are extended.

As mentioned above, the output lines 43 of Selection Control Unit 42 are applied to the grids of triodes 41 whose anodes are, in turn, connected to control windings 40 on the cores 35. For convenience in relating the said output lines with the associated triodes and control windings, the reference characters for the latter elements are provided with the same subscripts as said output lines.

The distribution of the control windings 40 on the cores 35 is such that for any digital setting of the output lines 43 of Selection Control Unit 42 (Figs. 1 and 2), at least one winding 40 on each core save that corresponding to said digital setting is energized by the associated triode 41 to drive its core into magnetic saturation. It is assumed, of course, that a triode 41, when conducting in response to a high potential (0 volts) on the associated line 43, draws sufficient current to enable the control windings 40 connected in the anode path thereof to drive the associated cores into magnetic saturation. One possible distribution of the control windings 40 is illustrated in Fig. 5 wherein the occurrence of the letter X in horizontal and vertical alignment, respectively, with the reference characters for a particular winding and a particular core, indicates the presence of that winding on that core. For example, the chart indicates that core $35_1$ is provided with control windings $40_1'$, $40_2$, $40_4$, and $40_8$ while core $35_8$ is provided with control windings $40_1$ and $40_8'$.

At this point it is deemed desirable to describe a sample operation of the selection circuit of the invention. For convenience it will be assumed that the Selection Control Unit is set up to effect selection of reading and recording head $26_1$ (Figs. 1 and 2). To this and the output lines $43_1$, $43_2'$, $43_4'$ and $43_8'$ of the Selection Control Unit assume high potentials of zero volts while the other output lines thereof assume low potentials of say —100 volts. The triodes 41 associated with the output line 43 that assume a high potential conduct and energize the associated control windings 40 on the cores 35. Referring to the charts of Figs. 5 and 6 it will be seen that at least one winding 40 on each of the cores 35, save core $35_1$, is energized to drive its core into magnetic saturation. For present purposes it will be assumed that the control windings are wound in proper direction to drive their cores into positive magnetic saturation rather than negative saturation although, if desired the said windings may be wound in the opposite direction. Core $35_1$, which is not driven into saturation, remains in the condition in which it was left on termination of a preceding setup of the Selection Control Unit which effected saturation thereof, that is, at the positive remanent or $B_r$ point of its hysteresis curve. Therefore, the windings 36 and 38 on core $35_1$ are capable of cooperating with one another as a transformer, whereas the saturated condition of the other cores prevents such cooperation between the windings 36 and 38 thereon. As a result, the minute playback signals induced in reading-recording head $26_1$ during playback operations are transmitted to the playback circuit 31 by way of inductive coupling between windings $36_1$ and $38_1$ on core 35, but the playback signals induced in the other heads 26 are blocked by the saturated state of the associated cores 35. In the same manner, when the operation is one of recording, the record pulses produced by record circuit 30 and transmitted to the windings 38 on all of the cores are transferred by induction only to the windings $36_1$ on core $35_1$ and thence to reading and recording head $26_1$.

The term saturation used in the above description may be defined as the degree of magnetic saturation which is required to reduce the efficiency of a core to such an extent that the ratio between the amounts of signal which are transferred inductively between windings 36 and 38 thereof when the same is not saturated and when the same is saturated is at least equal to the signal to noise ratio required for proper operation of the recording heads 26 and the playback circuit 31. In order to increase the said ratio as much as possible without requiring excessive biasing or saturating currents, cores are used which have non-rectangular hysteresis curves whose slope is as high as possible at the remanent or operating point and as low as possible at a point reasonably far into the saturation region. Stated more succinctly, cores are used which provide the highest possible ratio between the incremental permeability thereof at the remanent or operating point and at a reasonable saturation point, incremental permeability being defined as $$\frac{\Delta B}{\Delta H}=\frac{\text{change in flux density}}{\text{change in magnetizing force}}$$

In addition to requiring that the ratio between the incremental permeability of the cores at their operating and saturation points be as high as possible, it is also desired that the incremental permeability of each core at its remanent or operating point be as high as possible in order for the transformer comprising the windings 36 and 38 thereon to approach the status of an ideal transformer and thus be capable of producing output signals which are faithful reproductions of signals applied thereto. Additionally the eddy current losses in the cores should be as low as possible.

Cores meeting the above specifications may be constructed with thin or ultrathin Permalloy or super-malloy tape. In the illustrated instance of the invention each core 35 may be 0.5 inch in diameter (inner) and may comprise 100 wraps of .001 inch super-malloy or Permalloy tape. The control windings 40 may each include 200 turns, each winding 36 may include 175 turns and each winding 38 may include 200 turns. The biasing or saturating currents produced by the triodes 41 may be of the order of 150 milliamperes. It will be understood, of course, that the biasing current may be much smaller where only low level signals are to be handled. For example, if signals of the order of 60 millivolts (playback signals) are the largest which are to be handled, biasing currents of the order of 10–15 milliamperes are sufficient.

Typical hysteresis curves for D.C. and 400 c.p.s. operation of the cores 35 described above are illustrated in Fig. 8 wherein the remanent or operating point of the cores is designated $B_r$ and the saturation point thereof responsive to the described bias, is designated $B_s$. It will be noted that the slopes of the hysteresis curves are rather high at the $B_r$ points but are very low at the saturation point $B_s$. It will also be noted that the curve for 400 c.p.s. operation is substantially wider (along the abscissa) than is the curve for D.C. operation. This shape change with frequency is due, at least in part, to the fact that core losses increase with frequency, that is, the percentage of the applied signal which is effective as a magnetizing force decreases as frequency increases. A simplified formula for this relation is $$I_m=\frac{E_m}{L\omega}$$

where $I_m$ is the current actually available as a magnetizing force, $E_m$ is the effective applied signal voltage (magnetizing voltage), L is the inductance at the operating point of the core and $\omega$, as usual is $2\pi\times$frequency.

This inverse relationship between frequency and $I_m$, the current actually available as a magnetizing force, is used to great advantage in the operation of the means of the invention. In general the said relationship enables the selection circuit of the invention to handle signals that are of equal or even greater magnitude than the biasing curents for the cores thereof so long as the magnitude of the $I_m$ components of such signals is not sufficient to drive a said core far enough into the saturation region to distort the signal more than is permissible, or to pull a saturated core far enough out of saturation to produce a spurious signal whose magnitude exceeds that permitted by the signal to noise ratio of the circuit.

More specifically, the record signals which are applied to the windings 38 on the cores 35 in the instant embodiment of the invention, are of substantially the same magnitude as the bias currents utilized to saturate the cores, namely 150 milliamperes. However, the high frequency harmonics of the sharp (say, 2 microseconds) record signals effect quite a difference between the magnitude of said signals and the actual magnetizing current $I_m$ resulting therefrom. This is illustrated in Fig. 8, wherein by way of example only, the magnetizing currents $I_m$ produced by record signals are diagrammatically superimposed on the hysteresis loops of the figure. No hysteresis loop appropriate to the high frequency of the recording signal is illustrated but it will readily be seen that the record signals applied to a non-saturated core neither drive the same into positive saturation nor into negative saturation. It has been found that the negatively and positively directed record signals applied to a core produce substantially equal but oppositely directed record pulse outputs from the core. This indicates that due to the small magnitude of the magnetizing currents $I_m$, the inner hysteresis loops generated in response to negative and positive record signals, are more or less symmetrical, that is, chords joining the ends thereof are of substantially equal length and slope (almost equal incremental permeabilities).

The magnetizing currents $I_m$ appropriate to positive record signals applied to the winding 38 of a saturated core are substantially larger than those for a non-saturated core due to the low incremental permeability of the saturated core. However, as the said currents merely serve to drive the cores further into the saturation region thereof, very little, if any, of each signal is induced in the winding 36 on the core. The currents $I_m$ appropriate to negative record signals applied to the winding 38 of a saturated core are also larger than those for a non-saturated core but the same do not drive the core out of saturation to the remanent point $B_r$ as the incremental permeability of the core increases rapidly as the core is driven from the more densely saturated region toward the $B_r$ point and opposes further change. This opposition is so effective that it has been found that only a very small signal, one well within the signal to noise ratio of the system, is induced in winding 36 in response to negative record signals.

It is to be mentioned that the effect of leakage inductance i.e. inductance due to flux that is produced by input currents but which does not link with the output winding is in a large part responsible for the described mode of operation of the selection circuit of the invention. The leakage inductance for a non-saturated core is engligible due to the high permeability of the core. However, the permeability of a saturated core is so low that the core does not offer a much better path to magnetic flux than does the air surrounding the core and, therefore, the leakage inductance is quite high. The high leakage inductance together with the low magnetizing inductance of a saturated transformer reduces the output thereof to a harmless level.

The magnetizing currents produced by playback signals applied to the windings 36 of the cores 35 are also superimposed diagrammatically on the curves of Fig. 8 to indicate the effect the same have on the magnetic states of the cores. It will be noticed that the magnitude of the playback signals is so small relative to the saturating current utilized with the cores, and the same cause such small changes in the magnetic state of the latter that for all intents and purposes the incremental permeability for the frequency of operation appropriate to the playback signals (in the present instance about 25,000 c.p.s.) may be considered as equal for both the positively and negatively directed portions of the playback signals. Thus the output of the non-saturated core during a playback operation is a rather faithful reproduction of the playback signal applied to the winding 36 on the core.

It is to be noted that the principle of operation of the circuit of the invention is substantially different from that of known magnetic switching circuits and magnetic memory circuits which utilize rectangular hysteresis loop cores having a low incremental permeability at the remanent or $B_r$ points thereof. In the known circuits, the low incremental permeability of the cores at their $B_r$ points enables the input signals to produce rather large magnetizing currents $I_m$ capable of driving a core from a positive or negative remanent or $B_r$ point to saturation in the direction of opposite polarity, whence it returns to an appropriate remanent point of the said opposite polarity. Positive and negative signals applied to a core of the selection circuit of the invention (one having high incremental permeability at the operating point thereof) do not operate to shift the magnetic state of the core from its positive to its negative remanent or $B_r$ point or vice versa, but operate only to change the magnetic state of the core in the vicinity of that one of the remanent or $B_r$ points which is chosen as the operating point of the core, in the present instance, the positive $B_r$ point. This mode of operation, i.e. operation around either the positive or negative remanent or $B_r$ point but not from one to the other, makes it possible for input signals of approximately equal magnitude but of opposite polarity to produce output signals which are also of substantially the same magnitude but of opposite polarity. Operational characteristics of this sort are extremely desirous in magnetic recording systems and the like wherein, as in the instant embodiment of the invention, it is necessary to switch negative and positive record pulses and playback signals.

At this point it is to be mentioned that when a series of pulses of one polarity are applied to one of the windings 36 or 38 or a core, the remanent or $B_r$ point of the core may creep downward toward the origin. However, as the magnetizing currents $I_m$ are small, each pulse produces only a slight amount of creep. Further, as known in the art, incremental permeability is, in general, a decreasing function of B (induction), that is, the incremental permeability becomes higher as the operating point descends toward the origin. Therefore said creep does not operate to attenuate the outputs of the cores.

It is also to be mentioned that in recording operations, a reading and recording head 26 provides a low impedance, inductive load (say a few millihenries) for the associated transformer 35, 36, 38, and thus enables the latter to produce the large output currents required for recording on the drum. On the other hand, in playback operations, the reading or playback circuit 31 constitutes a high impedance load for the selected transformer 35, 36, 38 as the latter is connected to the grid of the first amplifier (not shown) of said circuit, and, the large output voltages (as opposed to large output currents) required for proper operation of the playback circuit are produced. In this latter connection, i.e. voltage output rather than current output, a maximum signal to noise ratio is provided when the resistance of the load is infinite.

The control signals applied to the output lines 43 of Selection Control Unit 42 to effect differential control over the selection circuit of the invention are of square wave form as indicated in Fig. 6. The effect of this is to produce rapid changes in the bias currents produced by the triodes 41 as the conductive states of the latter are changed by said signals. These rapid changes in bias currents, as applied to one or more control windings 40 for a given core 35, effect induction of large transients in the windings 36 and 38 on said core (Fig. 6). These transients, it has been found, may be of the same order of magnitude as or larger than the signals which it is desired to transmit via the non-saturated core. In the instant embodiment of the invention wherein the rate of change of the bias currents is rather high (due to the substantially square wave shape of the control currents) and the magnitude of change thereof is of the order of 150 milliamperes, the magnitude of the transient is approximately 70 milliamperes which is sufficient to effect recording on drum 25 via the reading and recording heads 26. Additionally, whereas the transients have a sharp leading edge they decay exponentially in accordance with the time constant of the circuit so that considerable time may elapse before the windings regain the D.C. level at which it is desired to transmit low level signals, for example, playback signals. In the instant embodiment of the invention, the duration of the transient is approximately 1½–2 milliseconds.

In systems wherein it is possible to disconnect the inputs and outputs of the selection circuit for the duration of the said transients, or wherein the transients either can be compensated for in other ways or ignored, no additional apparatus is required. For example, in the arrangement of Figs. 1 and 2 the transients may be ignored so long as the selection control circuit 42 switches set-ups only at predetermined times at which the playback circuit 31 is inoperable (by means of gating) and the areas of the drum which come under the reading and recording heads 26 at that time and in which spurious recordings are made, are not used for storing data.

In order to reduce the magnitude of the transients substantially, for example, to prevent spurious recording thereby on drum 25, an integrating circuit which may consist of a series resistor and a shunt condenser may be connected between each output line 43 of Selection Control Unit 42 and the grid of the associated triode 41. This integrates the square wave signals applied to the lines 43 and thereby prevents sudden, large changes in the bias currents which are drawn by the triodes 41 and which produce the large transients. In the instant embodiment of the invention an integrating circuit of this sort may reduce the magnitude of the transient currents flowing in a reading-recording head 26 from approximately 70 milliamperes to 6 milliamperes. This arrangement does not, however, effect any substantial change in the duration of the transients.

In some systems it is required or desired not only to reduce the magnitude of the transients substantially but also to shorten the duration thereof as much as possible so as to minimize the time lost in switching.

Means to this end will now be described.

Referring to Fig. 3 wherein like parts are given the same reference characters as in the other figures, each core 35 has a duplicate core 35A associated therewith. Each core 35A is provided with windings 36A and 38A identical with the windings 36 and 38 on the associated core 35, and also with a winding 40A for each winding 40 on the said associated core 35. The windings 40A contain the same number of turns as the appropriate windings 40 but are wound in opposite direction thereto. The windings 36A, 38A and 40A are connected in series with their associated windings 36, 38 and 40 which are otherwise connected in the same manner as described above and illustrated in Figs. 1 and 2.

The connections are such, that when a triode 41 conducts it not only effects saturation of the appropriate core 35 but also the associated core 35A. However, whereas the core 35 is saturated positively, the core 35A is saturated negatively although, if desired, the polarities may be reversed. The effect of this is that when a transient is induced in the windings 36 and 38 of a core 35, a substantially identical but oppositely polarized transient is induced in the windings 36A and 38A of the associated core 35A (Fig. 7). There are, therefore, two substantially equal but oppositely polarized transients induced in the circuit containing the windings 36A and 36 and the circuit containing windings 38A and 38. These oppositely polarized transients tend to cancel one another, but it has been found that some slight transient still remains for application to the reading and recording heads 26 or to the transfer contact 32 (Fig. 1) This transient is labeled "Resultant transient" in Fig. 7. In the instant embodiment of the invention the resultant transient (current in the load) is of the order of about 4 milliamperes in magnitude and 100–200 microseconds in duration where the original, uncompensated transient was of the order of 70 milliamperes and 1½–2 milliseconds.

It is believed evident, therefore, that the circuit arrangement of Fig. 3 serves very successfully to minimize both the magnitude and the duration of the transients induced in the windings 36 and 38 of the selection circuit of the invention. In connection with the duration of said transients, it is to be mentioned that the switching time of the circuit, that is, the time during which the circuit is in a non-stable state and thus is incapable of routing signals over a selected path without distorting the same, is not necessarily as long as the duration of the transient produced by switching the set-up of Selection Control Unit 42. It is only when signals which are referenced to a predetermined D.C. level are being handled that it is necessary to wait until the switching transients have decayed to that level before routing the signals over the selected path. However, where the signals are not referenced to a predetermined D.C. level it is only necessary to wait until the initial period of decay of the transient (high rate of decay) is past, after which the signals to be routed may be superimposed on the latter portions of the decaying transient. Thus whereas as indicated above for the instant embodiment of the invention the duration of the Resultant Transient may be of the order of 100–200 microseconds, the switching time of the circuit may not be that long but may only be of the order of say, 50 microseconds.

Whereas the above description is directed to a straight forward selection circuit which uses one core 35 for each of the several means which are to be selected between, it will be understood that the principle of the invention is equally well adapted for use with other selection circuit arrangements. For example, a two level circuit may be utilized wherein the series connected windings 38 of each of a plurality of circuits such as that indicated in Figs. 1 and 2 may be wired to a winding 36 of another such circuit. Here, common control means may be provided for all of the plurality of circuits. Preferably, two level circuits of this sort are used where the required selection capacity is so great that connecting sufficient cores in the straightforward manner disclosed in Figs. 1 and 2 would give rise to signal to noise or other difficulties.

Further, the principle of the invention may be combined with other known principles, for example, the principle of operation of magnetic amplifiers, to produce other selection circuits such as pyramids or trees. In an arrangement of this type as illustrated somewhat diagrammatically in Fig. 4, the first winding 38*a* of a first core 35*a* is connected in a series path with the first winding 38*b* of a second core 35*b*, and the second winding 36*a* thereof is connected in a series path with the first winding 38*c* of a third core 35*c*. When the first core 35*a* is saturated, there is substantially no inductive coupling between the first and second windings 38*a* and 36*a* thereof and signals applied to the said first winding are transmitted over the series path to the first winding 38*b* of the second core 35*b*. However, when the first core is not saturated, signals applied to the first winding 38*a* thereof are inductively coupled to the second winding 36*a* whence they are transmitted via the series path to the first winding 38*c* of the third core. At the same time, the drop across the first winding 38*a* of the first core prevents application of the signals to the first winding 38*b* of the second core 35*b*. The first and second windings of each of the second and third cores 35*b* and 35*c* may be connected with windings on another pair of cores in the same manner as those for the first core, or they may be connected to input-output lines for the circuit depending on the selection capacity the circuit is to have. It is to be noted that in the design of pyramid arrangements of this sort, measures must be taken to compensate for the differences in the paths through the pyramid. For example, one path comprises a straight series circuit through the first windings of a plurality ($n$) of cores, another comprises one inductive coupling (first to second winding of a core) and a series path through $n-1$ first windings, etc. The compensating measures may consist in providing the windings of the several cores with differential number of turns in known manner.

It is to be mentioned that in the pyramidal arrangement of Fig. 4, the mode of operation of the cores is substantially the same as that for relay operated transfer contacts.

It will be understood, of course, that means similar to those illustrated in Figs. 1 and 2 would be provided for controlling the operations of the circuit of Fig. 4.

If desired, a selection circuit may be utilized which operates solely on the principle of magnetic amplifiers, that is, one wherein signals are transferred over conductive paths including a winding on each of one or more saturated cores (saturable reactors).

Reference is made to the text "Ferromagnetism" written by Bozorth and published by the D. Van Nostrand Company of New York, 1951, for detailed discussions of the mathematical and magnetic principles on which magnetic cores such as those utilized in carrying out the present invention, operate.

While there has been above described but a single embodiment of the invention it will be understood that many modifications and additions thereto may be made without departing from the spirit of the invention and it is not desired therefore to limit the scope of the invention except as set forth in the appended claims or as dictated by the prior art.

I claim:

1. In a selection circuit comprising a plurality of saturable magnetic cores having non-rectangular hysteresis loops, a first winding on each core, a second winding on each core, at least one control winding on each core, means for energizing the control windings selectively to saturate their cores, a first input-output line, means connecting the first windings in series with said first input-output line and a plurality of second input-output lines connected respectively with each said second windings.

2. In a selection circuit for routing trains of pulses over a selected one of a plurality of paths, the combination of a plurality of saturable magnetic cores, each of said cores having an operating point solely about one of the remanent points and having a high incremental permeability at said operating point, a first winding on each core, a second winding on each core, each said path including an inductive coupling between the first and second windings on a core, differentially operable means including at least one control winding on each core for driving the cores into saturation at the same polarity as said operating remanent point, selectively, to block inductive coupling between the first and second windings thereon, means connecting the first windings in a series input-output path, and a plurality of input-output lines connected to said second windings in parallel, one per winding.

3. In a magnetic recording system, the combination of a multi-channel magnetic drum, a reading and recording head cooperating with each drum channel, a record circuit, a playback circuit, a plurality of saturable magnetic cores having a high incremental permeability at the operating points thereof, a first winding on each core, means connecting the first windings in a series path, means for connecting said series path with the record and playback circuits selectively, a second winding on each core connected with a said reading and recording head, and means including at least one control winding on each core for driving the cores into saturation selectively.

4. The combination according to claim 3 and including a second core for each first said core, first and second windings on each second core, each connected in series with the related first or second winding on the associated first core, and a control winding on each second core for each control winding on the associated first core, the control windings on the second cores being wound in opposite direction to those on the first cores.

5. In a magnetic reading and recording system the combination of a plurality of magnetic reading and recording heads, a record circuit, a playback circuit, a plurality of saturable magnetic cores, a first winding on each core, means connecting the first windings in a series path, means for connecting said series path with the playback and record circuits selectively, a second winding on each core connected to a said reading and recording head, inductive coupling between the first and second windings on a core connecting the associated said head to the series path, at least one control winding on each core, a plurality of normally cut off vacuum tubes having their anodes connected with said control windings selectively, and a selection control means for causing selected ones of said tubes to conduct and energize the associated control windings which drive their cores into saturation.

6. The combination according to claim 5 and including a second core for each first said core, first and second windings on each second core, each connected in series with the related first or second winding on the associated first core, and a control winding on each second core for each control winding on the associated first core, the control windings on the second cores being wound in opposite direction to those on the first cores.

7. In a selection circuit for routing trains of pulses over a selected one of a plurality of paths, the combination of a plurality of saturable magnetic cores, each of said cores having an operating point solely about one of the remanent points and a high incremental permeability at said operating point, a first winding on each core, a second winding on each core, each said path including an inductive coupling between the first and second windings on a core, differentially operable means including at least one control winding on each core for driving the cores into saturation at the same polarity as said operating remanent point, selectively, to block inductive coupling between the first and second windings thereon, means connecting the first windings in a series input path, and a plurality of output lines connected to said second windings in parallel, one per winding.

8. In a selection circuit for routing trains of pulses over a selected one of a plurality of paths, the combination of a plurality of saturable magnetic cores, each of said cores having an operating point solely about one of the remanent points and a high incremental permeability at said operating point, a first winding on each core, a second winding on each core, each said path including an inductive coupling between the first and second windings on a core, diffentially operable means including at least one control winding on each core for driving the cores into saturation at the same polarity as said operating remanent point, selectively, to block inductive coupling between the first and second windings thereon, means connecting the first windings in a series output path, and a plurality of input lines connected to said second windings in parallel, one per winding.

9. A circuit for selectively routing trains of pulses over a plurality of paths, comprising a plurality of saturable magnetic cores, each of said cores having a non-rectangular hysteresis loop and an operating point solely about one of the remanent points on said hysteresis loop, a first signal input-output means, a first winding on each core, said first windings being connected in series with said first input-output means, a plurality of second input-output means, a second winding on each core individually connected to a respective one of said second input-output means, said second input-output means operating the inverse of said first input-output means, at least one control winding on each core energizable to saturate its core at the same polarity as said operating remanent point and means for selectively energizing said control windings, whereby equal but oppositely polarized pulses may be selectively routed between a selected one of the plurality of input-output means respectively connected to said second windings and the input-output means connected to said first windings.

10. A circuit as set forth in claim 9 further including a second plurality of magnetic cores, each of said second cores having a non-rectangular hysteresis loop and an operating point solely about the other of said remanent points on said hysteresis loop, a first winding, a second winding and at least one control winding on each of said second cores, said first and second windings being wound in the same direction as the respective windings on said first core and said control windings being wound in the opposite direction to said first core control windings, each of said second cores being paired with one of said first cores such that the respective windings are connected in series.

11. A circuit for selectively routing trains of pulses over a plurality of paths, comprising a plurality of saturable magnetic cores, each of said cores having a non-rectangular hysteresis loop and an operating point solely about one of the remanent points on said hysteresis loop, a signal input means, a first winding on each core, said first windings being connected in series with said input means, a plurality of output means, a second winding on each core individually connected to a respective one of said output means, at least one control winding on each core energizable to saturate its core at the same polarity as said operating remanent point and means for selectively energizing said control windings, whereby equal but oppositely polarized pulses may be selectively routed between a selected one of the plurality of output means respectively connected to said second windings and the input means connected to said first windings.

12. A circuit as set forth in claim 11 further including a second plurality of magnetic cores, each of said second cores having a non-rectangular hysteresis loop and an operating point solely about the other of said remanent points on said hysteresis loop, a first winding, a second winding, and at least one control winding on each of said second cores, said first and second windings being wound in the same direction as the respective windings on said first core and said control windings being wound in the opposite direction to said first core control windings, each of said second cores being paired with one of said first cores such that the respective windings are connected in series.

13. A circuit for selectively routing trains of pulses over a plurality of paths, comprising a plurality of saturable magnetic cores, each of said cores having a non-rectangular hysteresis loop and an operating point solely about one of the remanent points on said hysteresis loop, a signal output means, a first winding on each core, said first windings being connected in series with said output means, a plurality of input means, a second winding on each core individually connected to a respective one of said input means, at least one control winding on each core energizable to saturate its core at the same polarity as said operating remanent point and means for selectively energizing said control windings, whereby equal but oppositely polarized pulses may be selectively routed between a selected one of the plurality of input means respectively connected to said second windings and the output means connected to said first windings.

14. A circuit as set forth in claim 13 further including a second plurality of magnetic cores, each of said second cores having a non-rectangular hysteresis loop and an operating point solely about the other of said remanent points on said hysteresis loop, a first winding, a second winding and at least one control winding on each of said second cores, said first and second windings being wound in the same direction as the respective windings on said first core and said control windings being wound in the opposite direction to said first core control windings, each of said second cores being paired with one of said first cores such that the respective windings are connected in series.

References Cited in the file of this patent

UNITED STATES PATENTS

| | | |
|---|---|---|
| 2,021,099 | FitzGerald | Nov. 12, 1935 |
| 2,053,156 | Livingston | Sept. 1, 1936 |
| 2,518,022 | Keister | Aug. 8, 1950 |
| 2,637,018 | Hertog | Apr. 28, 1953 |
| 2,666,151 | Rajchman et al. | Jan. 14, 1954 |
| 2,697,178 | Isborn | Dec. 14, 1954 |
| 2,734,182 | Rajchman | Feb. 7, 1956 |

UNITED STATES PATENT OFFICE

CERTIFICATE OF CORRECTION

Patent No. 2,884,620 April 28, 1959

Amir Hassan Sepahban

It is hereby certified that error appears in the printed specification of the above numbered patent requiring correction and that the said Letters Patent should read as corrected below.

Column 3, line 30, after "magnitude" insert a comma; same line, after "150 milliamps.)" strike out the comma; line 35, after "signals" insert a comma; line 36, after "15-60 millivolts)" strike out the comma; lines 41 and 42, after "individually" insert a comma; column 5, line 20, for "and" second occurrence, read -- end --; column 6, line 60, for "curents" read -- currents --; column 7, line 43, for "engligible" read -- negligible --; column 11, line 34, for "with each said" read -- with said --.

Signed and sealed this 3rd day of November 1959.

(SEAL)

Attest:

KARL H. AXLINE
Attesting Officer

ROBERT C. WATSON
Commissioner of Patents